United States Patent

Tindal

[15] 3,670,764

[45] June 20, 1972

[54] BUILDING UTILITY AND SERVICE SYSTEM

[72] Inventor: James A. Tindal, 18002 Mettler Avenue, Gardena, Calif. 90247

[22] Filed: Feb. 4, 1971

[21] Appl. No.: 112,557

[52] U.S. Cl. ............................... 137/357, 52/220, 285/137
[51] Int. Cl. ........................................................... F16l 5/00
[58] Field of Search ...................... 52/220; 4/191, 192, 3, 4; 137/356, 357; 285/137

[56] References Cited

UNITED STATES PATENTS 2,645,783   7/1953   Allen ......................................... 4/191

*Primary Examiner*—Henry T. Klinksiek
*Attorney*—Lyon & Lyon

[57] ABSTRACT

A building utility and service system which can be modified and rearranged according to the changing demands and requirements of the building generally comprises one or more collector units which collect various incoming utilities and services and extend them to the floors in the building, distributor units which distribute utilities and services from a collector unit throughout each floor, and utilization units which dispense certain utilities and services from a distributor unit to one or more outlets on a floor utilizing those certain utilities and services. Each unit includes portable transport sections comprised of a plurality of individual pre-fabricated elements which can be added to or stripped from the transport sections to alter their capacities and various connectors, connecting lines and transition components having quick connect and disconnect capabilities which interconnect the elements of the units and provide flexibility to the system.

29 Claims, 7 Drawing Figures

PATENTED JUN 20 1972
3,670,764
FIG. 2.
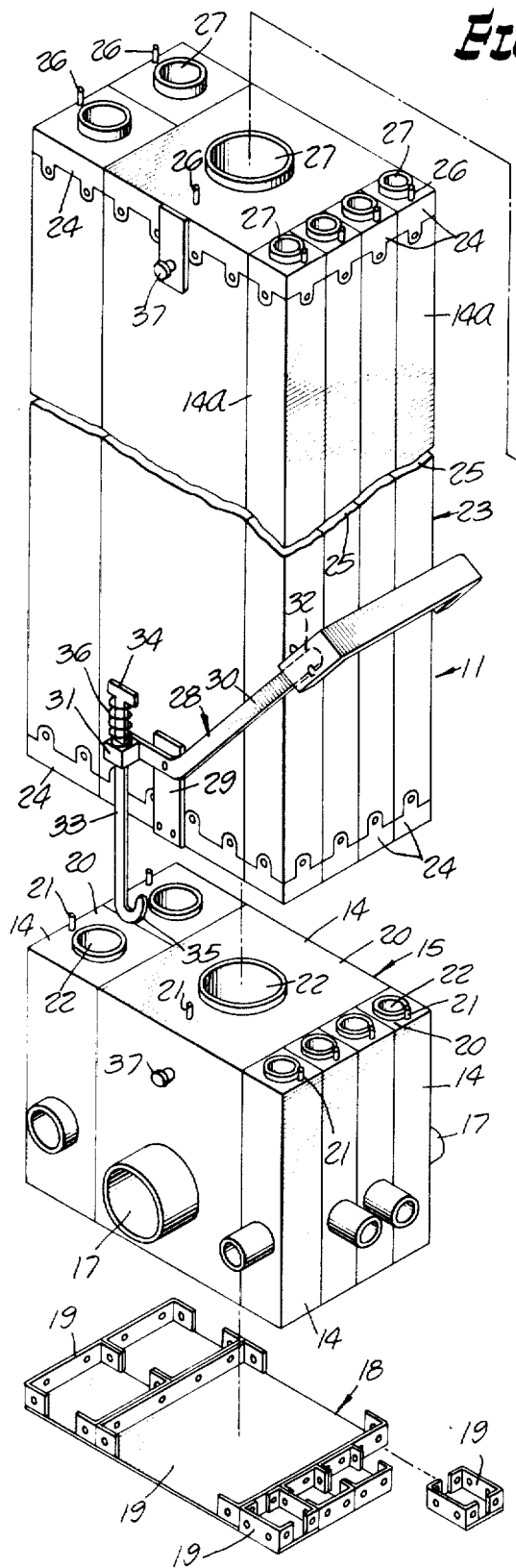
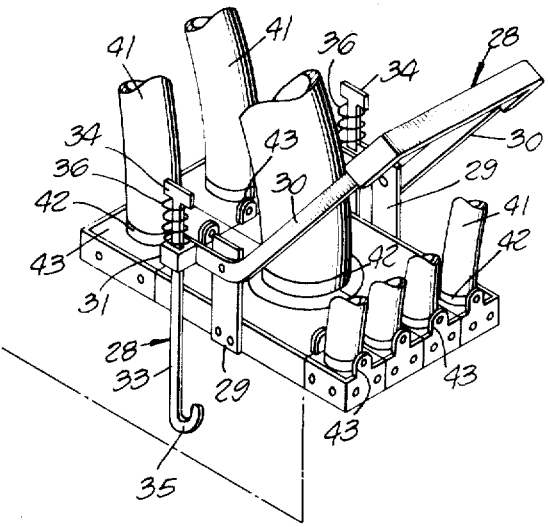
FIG. 7.
INVENTOR
JAMES A. TINDAL
BY Lyon & Lyon
ATTORNEYS INVENTOR.
JAMES A. TINDAL
BY Lyon & Lyon
ATTORNEYS

BUILDING UTILITY AND SERVICE SYSTEM

This invention relates generally to the art of building construction and more particularly relates to a pre-fabricated building utility and service system.

In the building industry, a major cost of construction is the installation of plumbing, electrical wiring, ducting and other mechanical and electrical fixtures required for heating, air conditioning, sanitation, water, electricity, gas, telephone and other services and utilities. Moreover, in office buildings and similar structures where there is a frequent changeover in tenants it is often necessary to rearrange and improvise floor plans and room designs to accommodate the particular requirements of the different tenants. This accommodation normally involves a modification of an existing utility and service system which again is costly and often restricted because of the inflexibility of the existing system.

Therefore, it is a primary object of this invention to provide a building utility and service system wherein the component parts of the system are adapted to be fabricated in the factory or the shop by modern high speed production techniques and are capable of rapid assembly and erection in the field with a minimum labor and expense. A further object of this invention is to provide a complete self-contained, self-supporting system which is substantially independent of the building structure and which can be modified and rearranged according to the changing demands and requirements of the building and thereby afford a wide latitude of architectural treatment and choice of materials of construction.

Another object of this invention is to provide a utility and service system having component parts with rapid connect and disconnect capabilities in order to facilitate the initial assembly and erection of the system and the subsequent modification and rearrangement of the system. A still further object of this invention is to provide a compact self-contained system which will increase the usable area of a building.

In hospitals, schools, hotels and similar structures it is desirable to provide multiple utility outlet stations such as multiple shower outlets to schools or multiple outlets of various utilities next to which a bed in a hospital may be placed. Therefore, in addition to the above object, it is a still further object of this invention to provide a building utility and service system having transport sections with a multiplicity of utility and service carrying elements adapted to efficiently serve one or more outlet stations.

In accordance with these objects, the building utility and service system of the present invention comprises one or more collector units which collect various incoming utilities and services and extend them through compact transport sections to the floors of the buildings, distributor units which distribute utilities and services through other compact transport sections from a collector unit to remote locations on each floor, and utilization units which dispense certain utilities and services through still other compact transport sections from the distributor units to outlets and multiple outlet stations utilizing those certain utilities and services. Flexible connecting lines, connectors, and transition components interconnecting the individual elements of the transport sections of the system and having rapid connect and disconnect capabilities facilitate the assembly and modification of the system.

Other and further objects and advantages of this invention will be made readily apparent from the accompanying drawings and the following detailed description.

In the drawings:

FIG. 2 is an exploded perspective view of the collector unit of the system.

FIG. 7 is a perspective view illustrating an adaptor section of the utilization unit used to connect the utilization transport section to multiple outlets.

Figure 1:
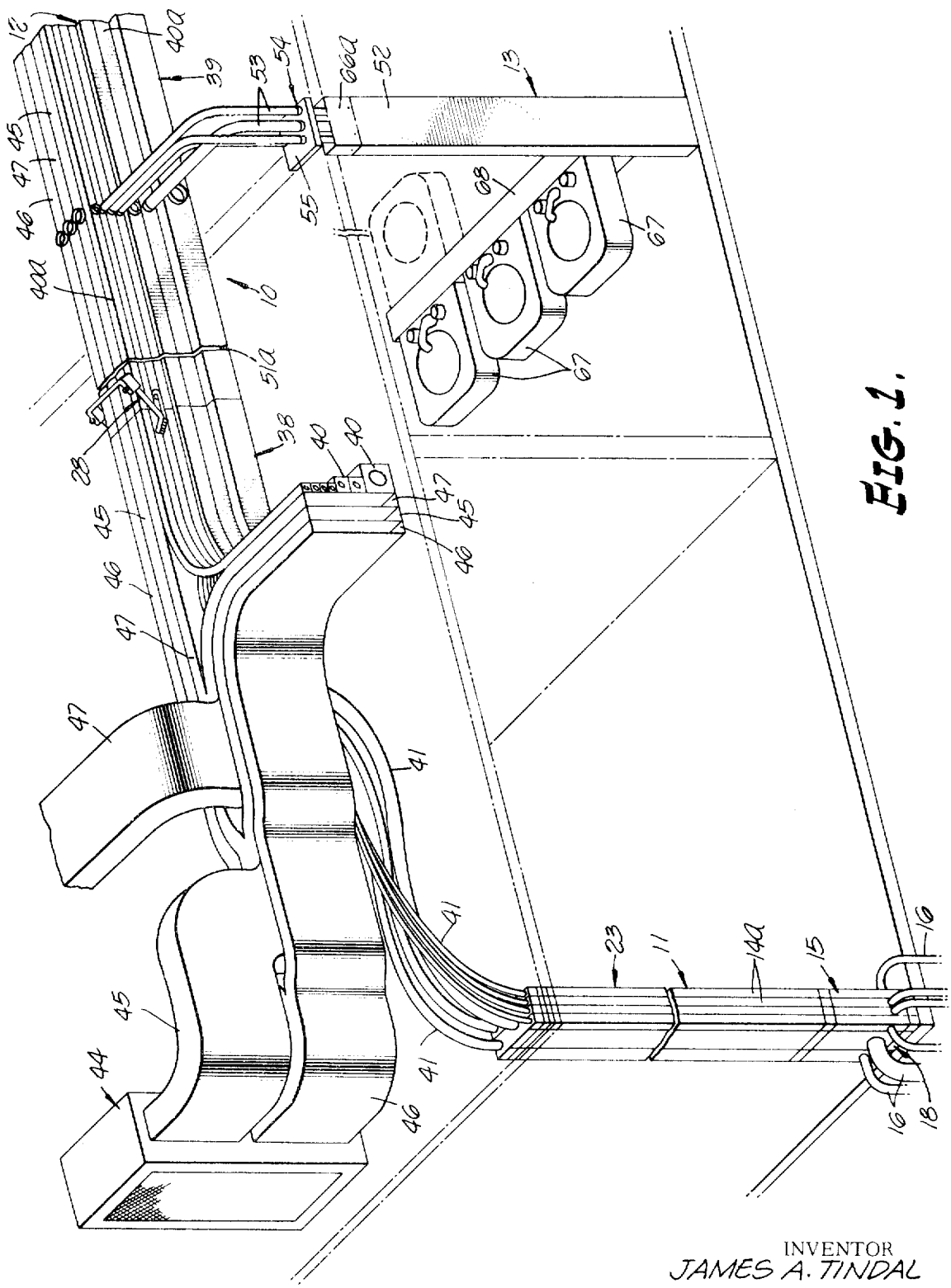
FIG. 1 is a perspective view of the system illustrating the relationship of the various units of the system.

Referring now in detail to the drawings, the system generally designated 10, is applicable to all types of structures, although it is particularly applicable to those structures such as hospitals and business buildings where there are changing service and utility demands and requirements. The system 10 includes three different interconnected units, a collector unit, generally designated 11, a distributor unit, generally designated 12, and a utilization unit, generally designated 13. A complete system 10 will generally comprise one or more collector units to service all the floors of the building, at least one distributor unit 12 to service the remote areas of each floor, and normally several utilization units for servicing various outlets or outlet stations throughout each floor.

The number of collector units 11 employed is dependent on the total floor area and the type of operations being conducted within the area. Referring now more particularly to FIG. 2, each collector unit is a modular unit having separately assembled sections, each of which includes a plurality of pre-fabricated service and utility carrying elements which after installation of the system 10 can be added to or stripped from the sections to modify and alter the capacity of the system.

The collector unit 11 includes a manifold section 15 which collects all the utility and service conductors 16 including the incoming plumbing, ducting and conduit at a single point and orients them in a vertical direction. It should be noted that each of the conductors 16 are generally provided with a shut off valve (not shown) which can be closed to prevent flow through the system during an alteration or modification of the system. The manifold section 15 also serves as the exhaust point for all waste systems that employ plumbing as a transport medium. The manifold section 15 includes a base plate, generally designated 18, which is comprised of a plurality of individual base plates 19 of various sizes which are bolted together. Each individual base plate 19 is adapted to receive one of the elements 14 which form the manifold. The elements 14 of the manifold section 15 are of various forms to hold the various types of utility conductors 17 therein, however, within those elements 14 for plumbing there is provided a clamping assembly, not shown, which can be adjusted to fit various sizes of pipe conductors. Preferably the core 20 of each element 14 is formed of polyurethane although an equivalent insulation may be used. The upper end of each element 14 is provided with an alignment pin 21 and the upper end of each conductor is equipped with a quick connect and disconnect male fitting 22.

The collector unit 11 also includes one or more portable vertical transport sections 23 which are comprised of a plurality of individual pre-fabricated elements 14a and are adapted to serve as modularized sections for the transport of utilities and services upward to the various floor levels. Each transport section 23, as seen best in FIG. 2, is similar in many respects to the manifold section 15 and includes at each end a plurality of brackets 24 which are connected together similar to the base plates 19. The brackets 24 secured to the lower end of each element 14a of the transport section 23 include pin holes (not shown) which mate with the alignment pins 21 of the aligned adjacent elements 14 of the manifold section. The elements 14a of the transport section are insulated by preferably a polyurethane core 25 and the brackets 24 secured to the upper end of each element are provided with alignment pins 26. The upper end of each utility and service conductor within the elements 14a is equipped with a quick connect and disconnect male fitting 27 while the lower end of each conductor is equipped with a quick connect and disconnect female fitting (not shown) which is adapted to receive the male fitting 22 of a manifold element 14. It should be noted that the quick connect and disconnect fittings for the utility conductors carrying fluids involve an automatic shut off during disconnection which is opened by the connection of the fittings to establish communication between the connected utility conductors. Preferably, only the female fitting or lower end of each conductor is provided with a shut off since the primary purpose of the shut off is to prevent fluid in the conductor from draining into the building when the conductor is stripped from the system.

The sections of the collector unit 11 are joined together by a tension latch mechanism, generally designated 28. The latch mechanism 28 is a past center cam locking mechanism and the lower end brackets 24 serve mounts for the latch mechanism 28. The tension latch mechanism 28 includes mounting fixtures 29 secured to each side of the section and a lever handle 30 which is pivotally mounted to the mounting brackets 29 between the latch carrying ends 31 of the handle 30 and a free grip section 32 of the handle 30. Preferably means are provided to permit disconnection of the grip section and whereby elements may be removed or added to the section without interfering with the latch mechanism. Slidably mounted to each end 31 is an elongated latch 33 which has a T-bar 34 at one end and a hook 35 at the other end. Spring members 36 mounted coaxially about each latch 33 and positioned between the T-bars 34 and the ends 31 of the handle apply a force against the T-bars 34. The hooks 35 are adapted to receive latch fittings 37 affixed to each side of another section. When joining two sections, the sections are first positioned in the proper alignment with the male fittings being received by the appropriate female fittings and the alignment pins being received by the appropriate pin holes (not shown). The handle of the latch mechanism 28 is then pivoted about the brackets 29 to move the hooks 35 into engagement with the latch fittings 37 and continued pivoting of the handle compresses the springs 36 to lock the latch mechanism 28 with the springs 36 providing the desired tension to the latch 33. Any number of vertical transport sections 23 can be joined together by the tension latch mechanisms 28 for extension of the utilities and services to any height necessary to accommodate the various levels within a building.

The distributor units 12, as stated previously, distribute the utilities and services to remote areas on each floor or level of a building. Each distributor unit 12 includes a portable transition section, generally designated 38, and one or more portable horizontal transport sections, generally designated 39. The transition section 38 changes the utility and service flow direction from vertical to horizontal and is formed by a plurality of individual pre-fabricated utility and service carrying elements 40 having utility and service flow dividing characteristics and each horizontal transport section 39 is formed by a plurality of individual pre-fabricated utility and service carrying elements 40a which are similar to the elements 14a of the vertical transport section 23. A distributor unit 12 is connected to the collector unit 11 by flexible connecting lines or hoses 41. The hoses are of sufficient lengths to allow for vertical disposition while permitting maximum freedom for mounting the distributor unit 12 above, below or even with the top of a vertical transport section of the collector unit 11. One end of each hose is affixed to an element 40 of the transition section 38 and the other end of each connecting hose 41 is provided with a quick connect and disconnect female fitting 42 which is adapted to receive a male fitting 27 at the upper end of a vertical transport section 23. The female fittings 42 are held by bracket fixtures 43 which are connected together and serve as a mount for a latch mechanism 28 which locks the female fittings 42 onto the male fittings 27.

Figure 3:
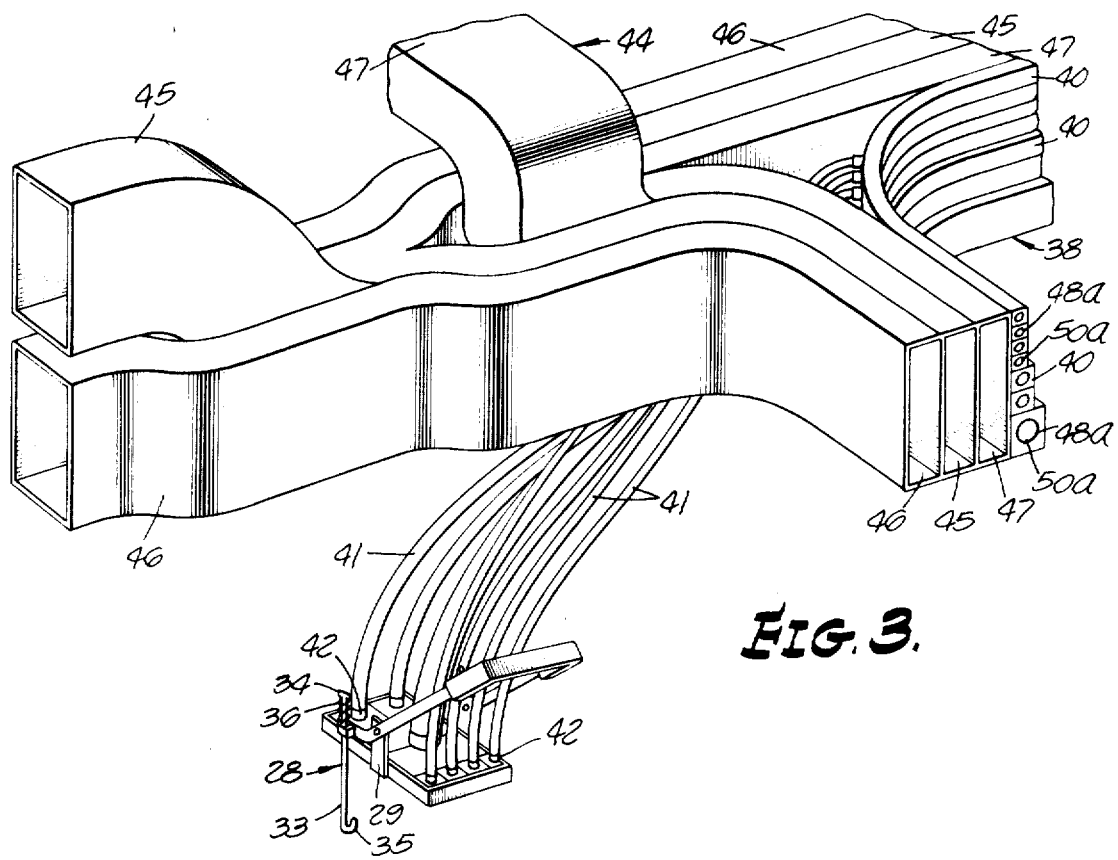
FIG. 3 is a perspective view illustrating the transition section of the distributor unit of the system and the incorporation of an air treatment facility within the system.
Figure 4:
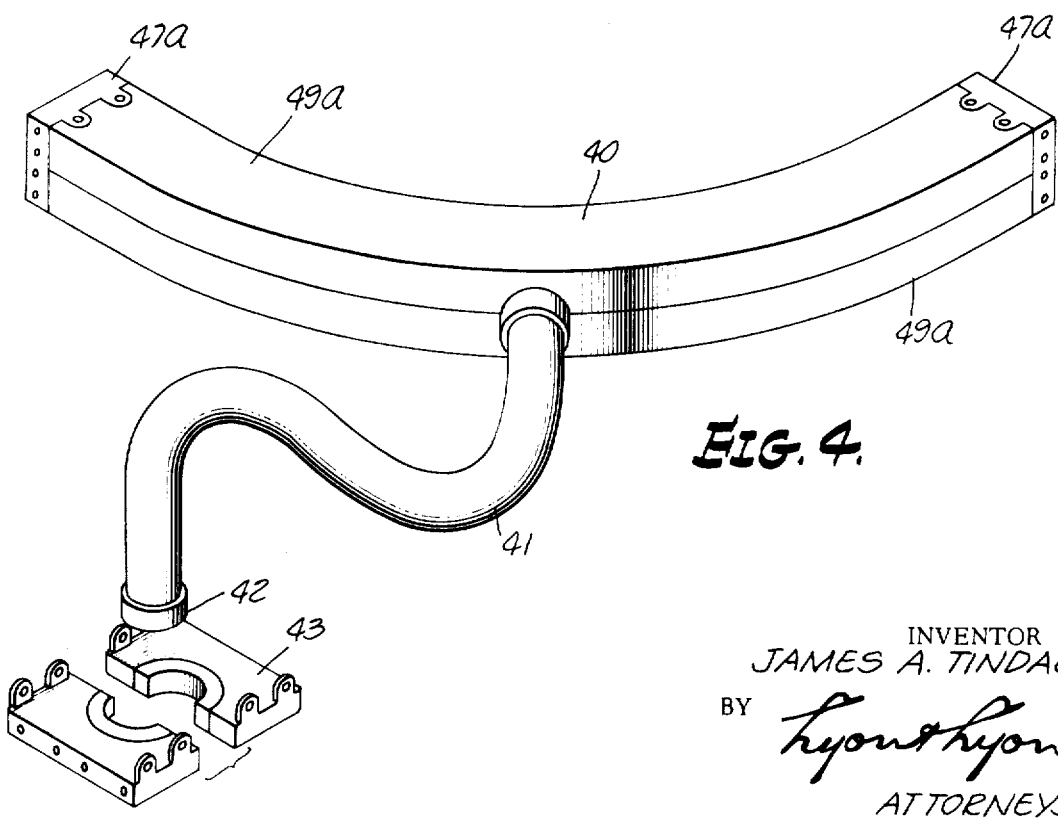
FIG. 4 is a perspective view illustrating an element of the transition section with utility and service flow dividing capabilities.
Figure 5:
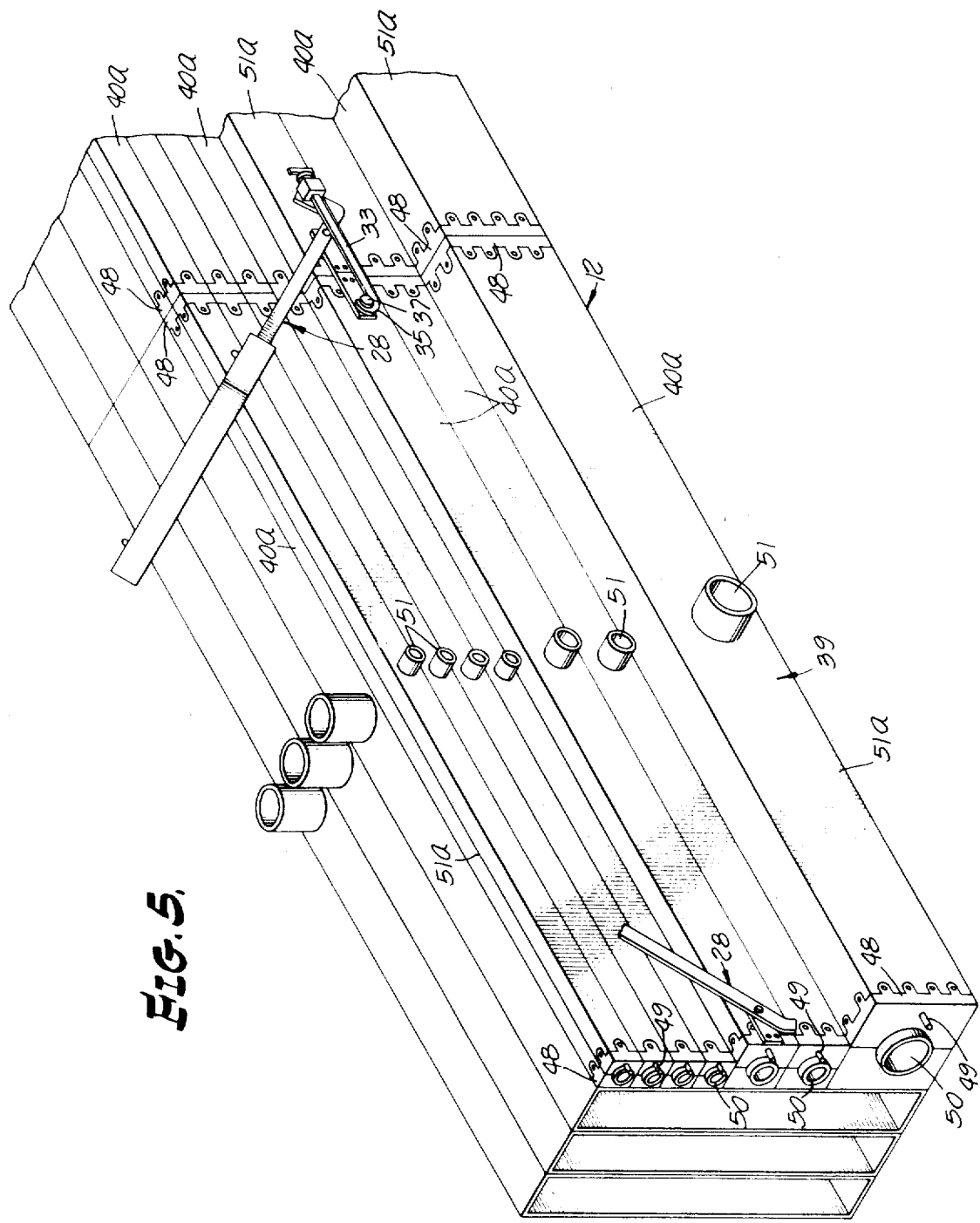
FIG. 5 is a perspective view illustrating the horizontal transport section of the distributor unit in association with the air transport ducts.
Figure 6:
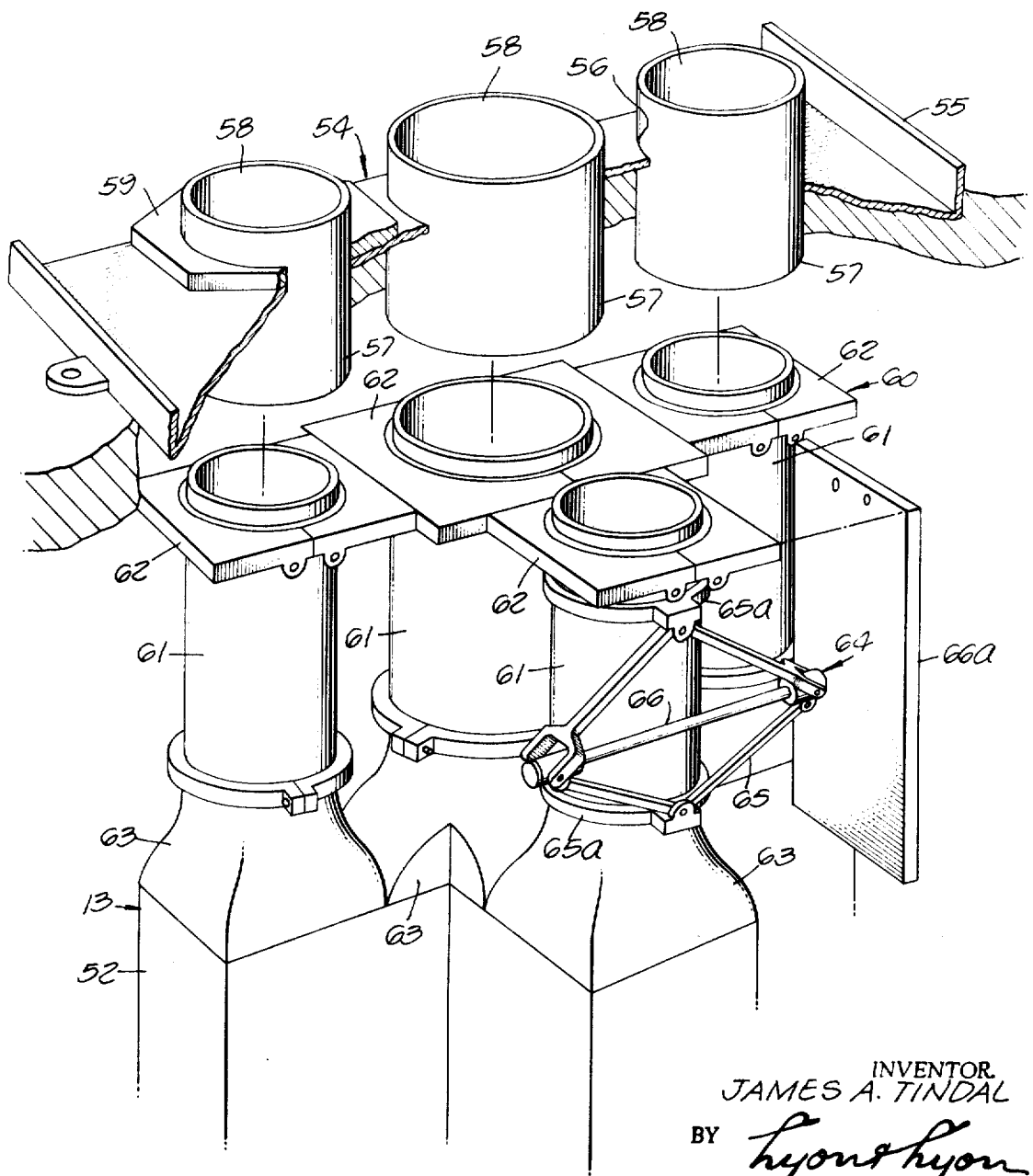
FIG. 6 is a perspective view of the transport section of the utilitzation unit of the system illustrating the transition components for mounting the utilization transport section and interconnecting it with the distributor unit.

As shown in FIGS. 1, and 3 the air treatment system, generally designated 44, including hot air ducts 45, cold air ducts 46, and return air ducts 47, is incorporated within the distributor unit 12. However, if the air treatment system 44 is not located adjacent the floor where the air is used then the air treatment ducts may be incorporated within the vertical collector unit 11. The air ducts are secured or sealed together and the elements 40 which preferably include a 90° bend are secured to the ducts in a vertically disposed fashion and serve as the structural carrier for the air ducts. The curved flow divider elements 40 are similar in construction to the other prefabricated utility carrying elements of the system and include end brackets 47a with alignment pin holes 48a and insulated cores 49a, preferably polyurethane, with each end of the conductor with the elements being provided with a quick connect and disconnect male fitting 50a.

The horizontal transport sections 39 are similar to the vertical transport sections 23 of the collector unit 11 with the elements 40a having a bracket 48 at each end and preferably a polyurethane core 51a. The brackets 48 at one end are provided with an alignment pin 49 and the brackets at the other opposite end of the elements 40a include a pin hole (not shown). Also, one end of the utility conductor within each element 40a is equipped with a quick connect and disconnect female fitting 50 while the other end of each utility conductor is provided with a quick connect and disconnect male fitting (not shown). However, the horizontal transport sections 39 normally include elements 40a which are substantially smaller in proportion than the elements 14 of the vertical transport sections since several distributor units may be dependent on a single collector unit 11 and its elements 14. The horizontal transport sections 39 also differ from the vertical transport sections 23 in that the elements 40a include laterally disposed quick connect and disconnect female fittings 51 placed at specific longitudinal stations. It should also be noted, that horizontal transport sections having 90° and 45° c8 bends can also be provided for better distribution which are the same as the straight horizontal transport sections 39 except that they are not provided with the laterally disposed female fittings 51. The horizontal transport sections 39 are joined to other horizontal transport sections and to the transition section 38 by tension latch mechanisms 28 mounted at the end of the section having the female fittings 50, with the female fittings 50 each receiving a male fitting and thereby connecting the appropriate utility conductors of the elements of the different sections.

Each utilization unit 13 is connected to the distributor 12 by flexible connecting lines or hoses 53 which are similar to the lines 41 and which provide a considerable amount of latitude for placement of the utilization units 13. Each utilization unit 13 includes a vertical transport section or post section 52 which extends between the floor and the ceiling of a level and is mounted in compression in order to support relatively heavy cantilevered loads. The posts include passages therein for communication of the utilities to outlets or outlet stations and consist of any cross-sectional shape or size. However, it is contemplated that the dimensions of each shape will generally conform to the width of a wall and at least three shapes are felt to be particularly desirable; a flat shape which can serve as part of a wall between two adjoining rooms, a T-shape such as shown in the drawings which can serve as the corner for the walls of adjoining rooms, and a cross-shape which can serve as the corner for the walls of four adjoining rooms. In any case, irrespective of the particular shape of the post, additional elements can be added on to increase the overall number of passages.

The passages of each post 52 are connected to the flexible connecting lines 53 through a coupling assembly, generally designated 54, adjacent the upper end of the post 52 which extends above and below the ceiling when the distributor unit 12 is located above the ceiling, such as illustrated in the drawings. However, it is evident that the distributor unit 12 could also be located below the floor and in such circumstances the coupling assembly is positioned adjacent the lower end of the post 52 and extends below and above the floor. The coupling assembly includes a bracket 55 which includes a plurality of pre-cut holes 56 and serves as a mount for couplers 57 which extend through either the floor or the ceiling. Both ends of each coupler are provided with quick connect and disconnect fittings 58 and each fitting 58 at the end of the coupler 57 either above the ceiling or below the floor secured to the bracket 55 by a retainer nut 59 is connected to one end of a hose 53, the other end of which is connected to a laterally displaced fitting 51 of the horizontal transport section 39. Each fitting at the other end of the couplers 57 is connected to a connector assembly, generally designated 60, which includes one or more connectors 61 each having extension means, not shown but preferably in the form of a slip joint, which permits extension of the connectors 61 during the mounting of the post 52. The end of each connector 61 connected to a coupler 57 is provided with quick connect and disconnect fittings and a modular bracket fixture 62 which is adapted to be connected to the adjoining bracket fixtures of the other connectors 61. The other end 63 of each connector 61 is connected to the post 52. It should be noted that both the end of each fluid carrying hose or line 53 connected to coupler 57 and the end of each fluid carrying connector 61 connected to coupler 57 are provided with automatic shut-offs which actuate upon disconnection.

An actuator mechanism, generally designated 64, used to place the post 52 in compression includes a linkage member 65 which is secured to retainer bands 65a mounted on a connector 61 and a screw actuator 66. As stated before it is necessary that each post 52 be mounted under compression and during installation of a post 52 the screw actuator 66 will extend the connectors 61 secured to the post the necessary vertical distance to secure the connectors 61 to the couplers 57 and to create the desired compression. The connector assembly 60 and the actuator mechanism 64 are both preferably covered by a detachable shroud 66a for appearance purposes.

Outlet fixtures 67 may be connected directly to the post 52 or, as shown in FIG. 1, an adaptor section 68 can be used to distribute the utilities to the outlet fixtures 67, with each fixture being connected to the adaptor section 68. The adaptor section 68 allows great flexibility for mounting outlet fixtures which can be connected to the adaptor section 68 in a variety of positions and is particularly desirable in providing a multiple service and utility outlet station for use in such buildings as hotels and hospitals. A typical adaptor section 68 for fluids is shown in FIG. 7. The section 68 includes a plurality of conductors 69 within an insulated core 70 with each conductor having multiple inlets or outlets 71 all provided with quick connect and disconnect fittings 72.

It should be noted that throughout the system certain materials are treated to resist acid deterioration or corrosion. In addition, the elements can be finished to match any decor desired and the types of finish employed can be those requiring a minimum of maintenance.

The utility and service system of this invention is a compact self-contained, self-supporting system which is independent of the building structure and therefore readily lends itself to an easier and less costly installation and subsequent alterations. The system is comprised of elements and components adapted to be fabricated in the factory and such elements and components can be added or stripped from the system with very little effort or time required to alter the operating capacity of the system. The system is particularly adaptable to hospitals, hotels, schools and other buildings having changing service and utility demands and requirements and having utility and service stations with multiple outlets.

Having fully described my invention, it is to be understood that I do not wish to be limited to the details herein set forth or to the details illustrated in the drawings, but my invention is of the full scope of the appended claims.

I claim:

1. A building utility and service system, comprising:
   portable transport sections for distribution of utilities and services throughout the building;
   individual pre-fabricated utility and service carrying elements forming each said transport section and having detachable mounting means to permit alteration of the utility load capacity of each said transport section; and
   flexible utility and service carrying means for connecting said elements of one said section distributing utilities and services in one direction with said elements of another said section distributing utilities and services in another direction and thereby permitting variation in the positioning of said two sections.

2. The system of claim 1, wherein each said transport section is provided with clamping means for connection and disconnection of said portable transport sections in series according to the desired extension required for the distribution of utilities and services.

3. The system of claim 1, wherein each said utility and service carrying element includes an inlet, at least one outlet, and flow shut off means to prevent flow through each said element when disconnected.

4. A building utility and service system comprising:
   at least one collector unit collecting incoming utilities and services and extending them to the various floors of the building;
   distributor units distributing utilities and services from a said collector unit to remote locations on the floors;
   utilization units dispensing certain utilities and services from a said distributor unit to utility and service outlet stations on the floors;
   individual pre-fabricated utility and service carrying elements forming said units having detachable mounting means to permit alteration of the utility and service load capacity of each said unit; and
   flexible utility and service lines connecting said elements of each said unit without substantially restricting the relative locations of said units.

5. The system of claim 4, wherein said elements of said collector unit are mounted together in one or more groups, with each said group defining a portable transport section.

6. The system of claim 5, wherein each said section is provided with clamp means, said clamp means adapted to connect said sections together in series to provide the desired extension of said collector unit.

7. The system of claim 4, wherein said elements of each said distributor unit are mounted together in at least two groups, with one said group defining a transition section and said other groups each defining a portable transport section.

8. The system of claim 7, wherein each said section is provided with clamp means, said clamp means adapted to connect said sections together in series to provide the desired extension of said distributor unit.

9. The system of claim 7, wherein said sections of said transition section each have utility and service flow dividing capabilities.

10. The system of claim 9, wherein the flexible utility and service lines connecting said elements of said collector unit with said elements of said collector unit are each connected at one end to an element of one of said collector transport sections and at the other end to an element of said transition section.

11. The system of claim 4, wherein said elements of said collector unit and said distributor unit are mounted together in separate sections, said sections of each said unit being connectable in series to extend the overall length of each said unit.

12. The system of claim 4, wherein said elements of said collector unit each include an outlet and an inlet and said elements of said distributor unit each include an inlet, at least one outlet, and flow shut off means each operable when said element is disconnected.

13. The system of claim 12, wherein said elements of said distributor unit each include an inlet and a first outlet and a second outlet laterally displaced between said inlet and said first outlet.

14. The system of claim 13, wherein said flexible utility lines connecting the elements of said distributor unit with said elements of said utilization unit are each connected at one end to one of said second outlets.

15. The system of claim 4, wherein each said utilization unit is mounted between two floors in compression to support outlet fixtures.

16. The system of claim 4, wherein certain of said utilization units are provided with adaptor sections including at least one utility and service carrying conductor, said conductor having a plurality of outlets each adapted to be connected to a utility and service outlet.

17. A building utility and service system, comprising:
at least one collector unit for collecting utilities and services together and extending them to various levels of a building, said collector unit including at least one portable transport section for extending the collected utilities and services vertically within the building;
first individual pre-fabricated utility and service carrying elements forming said transport section and having detachable mounting means for alteration of the utility and service load capacity of said transport section;
distributor units for distributing utilities and services from said collector unit throughout the levels of the building, each said distributor unit including a portable transition section having utility and service flow dividing capabilities and at least one portable transport section for distributing utilities and services horizontally within a level of the building;
second individual pre-fabricated utility and service carrying elements forming said transition section and third individual pre-fabricated utility and service carrying elements each connected to one of said second elements forming said horizontally distributing transport section, said second and third elements each having detachable mounting means for alteration of the utility and service load capacity of said sections;
utilization units for dispensing certain utilities and services from said distributor units to various utility and service outlets utilizing those certain utilities and services, each said utilization unit including a transport section having at least one passage for carrying at least one utility and service to a utility and service outlet;
first flexible utility carrying means for connecting each said second element with one of said first elements; and
second flexible utility carrying means for connecting each said passage to one of said second elements.

18. The system of claim 17, wherein each said first element includes an inlet end and an outlet end, each said second element includes a pair of outlet ends and an inlet disposed therebetween, each said third element includes an inlet end, an outlet end, and at least one outlet displaced therebetween, and each said passage includes an inlet end and an outlet end.

19. The system of claim 18, wherein said collector unit includes a plurality of transport sections connected successively in series with said inlet ends of said elements of each section connected in series being in matched alignment with the outlet ends of said elements of said succeeding section.

20. The system of claim 19, wherein each said transport section includes clamp means for connecting said sections in series whereby any number of sections can be connected in series to accommodate a building of any number of levels.

21. The system of claim 18, wherein each said distributor unit includes a plurality of transport sections connected successively in series with said inlet ends of said elements of each section connected in series being in matched alignment with the outlet ends of said elements of said succeeding section.

22. The system of claim 21, wherein each said transport section includes clamp means for connecting said sections in series whereby any number of sections can be connected in series to accommodate any size level within the building.

23. The system of claim 17, wherein air treatment components are incorporated within the system with certain of said sections being adapted to structurally support the air treatment ducting.

24. The system of claim 17, wherein said collector unit is provided with a manifold section adapted to receive incoming and outgoing utility and service lines, said manifold section including a plurality of individual utility and service carrying elements adapted to orient said lines with respect to said transport section.

25. The system of claim 17, wherein said transport sections of said utilization units are each provided with extendable connecting means and actuating means cooperating with said extendable connecting means to mount each said transport section in compression between two levels of the building.

26. The system of claim 17, wherein pre-fabricated elements are provided for said utilization units, each said element connectable to a transport section to increase said transport section passages.

27. The system of claim 17, wherein each said utilization unit is provided with coupling means adapted to extend between a floor or ceiling separating two levels of the building and secure said second flexible utility and service carrying means to said passages.

28. The system of claim 17, wherein said transport sections of said utilization units are adapted to be incorporated with the walls of the building.

29. The system of claim 17, wherein adaptor means are provided for said utilization units, said adaptor means including a plurality of utility and service carrying conductors adapted to be connected to said passages and to service a plurality of utility and service outlets.

* * * * *